(12) United States Patent
Hess et al.

(10) Patent No.: US 11,898,695 B2
(45) Date of Patent: Feb. 13, 2024

(54) PROGRESSIVE DISTRIBUTOR FOR LUBRICANT

(71) Applicant: SKF LUBRICATION SYSTEMS GERMANY GMBH, Walldorf (DE)

(72) Inventors: Dieter Hess, Ludwigshafen (DE); Juergen Kreutzkaemper, Waibstadt-Daisbach (DE); Markus Mandera, Leimen (DE); Andreas Schoenfeld, Sankt Leon-Rot (DE); Stefan Schuermann, Walldorf (DE); Dennis Zahn, Karlsdorf-Neuthard (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 239 days.

(21) Appl. No.: 17/189,656

(22) Filed: Mar. 2, 2021

(65) Prior Publication Data

US 2021/0317949 A1 Oct. 14, 2021

(30) Foreign Application Priority Data

Apr. 8, 2020 (DE) .......................... 102020204553.4

(51) Int. Cl.
*F16N 25/00* (2006.01)
(52) U.S. Cl.
CPC .................... *F16N 25/00* (2013.01)
(58) Field of Classification Search
CPC ........... F16N 25/00; F16N 25/02; F16N 25/04

USPC ......................................................... 184/6.12
See application file for complete search history.

(56) References Cited

U.S. PATENT DOCUMENTS

| | | | |
|---|---|---|---|
| 9,945,471 B2 * | 4/2018 | Itoo ..................... | F16H 57/0441 |
| 2013/0061967 A1 * | 3/2013 | Klaphake ................ | F16N 25/02 |
| | | | 137/861 |
| 2022/0107053 A1 * | 4/2022 | Hess ....................... | F16N 25/04 |

* cited by examiner

*Primary Examiner* — Michael R Mansen
*Assistant Examiner* — Mark K Buse
(74) *Attorney, Agent, or Firm* — J-TEK LAW PLLC; Scott T. Wakeman; Mark A. Ussai

(57) ABSTRACT

A progressive distributor for lubricant includes a housing block having an inlet and a plurality of outlets and a plurality of metering pistons received in associated piston bores in the housing block. Each piston bore is associated with two lubricant outlet bores, and each metering piston is displaceable and configured to alternatingly release the one or the other lubricant outlet bore in order to dispense the metered lubricant amount to the lubricant outlet bore. The piston bores are fluidically connected to the lubricant inlet bore and to each other via connecting bores in order to transfer lubricant to the other piston bores. A dummy piston is disposed in one of the piston bores that permanently closes both the lubricant inlet bore and both lubricant outlet bores, and includes at least one bypass passageway that fluidically connects two of the connecting bores to each other.

11 Claims, 3 Drawing Sheets

PROGRESSIVE DISTRIBUTOR FOR LUBRICANT

CROSS-REFERENCE

This application claims priority to German patent application no. 10 2020 204 553.4 filed on Apr. 8, 2020, the contents of which are fully incorporated herein by reference.

TECHNOLOGICAL FIELD

The present invention relates to a progressive distributor for lubricant according to the preamble of patent claim 1.

BACKGROUND

A progressive distributor or a progressive lubricant system serves to divide a lubricant provided by a pump into a plurality of parts and to supply a number of lubrication points/consumers with lubricant. An important design of distributors is referred to as a block distributor. In this progressive distributor a steel block (housing) forms the base that is machined and into which pistons are inserted that distribute the lubricant. For this purpose bores are introduced into the housing block, into which bores the metering pistons are inserted, which are in turn supplied with lubricant via a common lubricant inlet bore. Here the system is designed precisely before being put into operation. It is generally not possible to adapt such a system to be used with a smaller number of lubrication points. In particular, it is difficult to take a metering piston out of operation, since this will render some progressive distributors non-functional. Accordingly the number of outlets (two per metering piston) and the distribution ratio remains the same, even if individual lubrication points later have to be removed from the system. In addition, progressive distributors of this design have a high variance and thus high storage costs. For every two further desired outlets an additional piston and thus a different workpiece/housing block is necessary, which must be produced and kept in stock.

In order to counter this difficulty, in the prior art a dummy piston is inserted into one of the cylinder bores, which seals the lubricant inlet bore associated with the bore, with the result that no lubricant can reach into the bore and be delivered via the lubricant outlets. In order to nonetheless distribute lubricant in the progressive distributor past the dummy piston, an annular space is provided on the dummy piston, with the result that lubricant can be guided past the piston to the other bores without lubricant being dispensed.

However, it is disadvantageous in the known systems that lubricant can accumulate in the region of the dummy piston and is not further transported, with the result that the lubricant ages and over time blocks the connection to the other bores. This leads to a total failure of the lubrication system.

SUMMARY

It is therefore an aspect of the present disclosure to provide a progressive distributor that is modularly constructible and that can be used to provide lubrication to a variable number of lubrication points, but has a significantly longer service life.

In the following, a progressive distributor for lubricant is disclosed that is also constructed in block design and includes a housing block including a plurality of bores. Here the housing block includes, inter alia, a lubricant inlet bore, via which lubricant is introducible into the progressive distributor, and a plurality of lubricant outlet bores, via which a metered quantity of lubricant is respectively dispensable to consumers connectable to the respective lubricant outlet bore. Furthermore, for dispensing the metered quantity of lubricant a plurality of metering pistons are provided in the housing block, which metering pistons are received in associated piston bores, wherein two lubricant outlet bores are associated with each piston bore. The metering piston itself is displaceable in the piston bore and designed to alternatingly release the one or the other lubricant outlet bore in order to dispense the metered quantity of lubricant to the lubricant outlet bores. Furthermore, the piston bores are in fluidic connection with the lubricant inlet bore, and the piston bores are fluidically connected to each other via two connecting bores in order to transfer lubricant to the other piston bores.

In order to provide a modular yet durable progressive distributor, a dummy piston is furthermore disposed in at least one of the piston bores, which dummy piston permanently seals both the lubricant inlet bore and both lubricant outlet bores, and includes at least one bypass connection that fluidically connects two of the connecting bores in order to direct lubricant past the dummy piston into the connecting bore leading to the next piston bore. Of course, the dummy piston 8 is removable when it is desired to reconfigure the progressive distributor. As used herein "permanently seals" merely indicates that the dummy piston remains in place and seals both the lubricant inlet bore and both lubricant outlet bores when the progressive distributor has been configured to operate and is operating in a particular manner. In other words, the dummy piston does not unseal the lubricant inlet bore and the lubricant outlet bores while the progressive distributor operates.

The inventors have recognized that in particular in the region of the lubricant outlet bore that is fluidically connected to the annular space in the prior art, lubricant can accumulate and age even when the lubricant inlet bore is closed. Since in addition the lubricant outlet bore cannot be vented, a pressure imbalance can build up in the progressive distributor due to compressed air, which pressure imbalance can adversely influence the metered dispensing of lubricant. By closing both the inlet bore and outlet bore, an improved transit of the lubricant past the dummy piston can be achieved, which on the one hand improves the service life of the progressive distributor itself and also improves the precision of the lubrications themselves.

According to one advantageous exemplary embodiment, the bypass connection is configured as a bypass bore through the dummy piston, which bypass bore fluidically connects two connecting bores. In this simplest case, the bypass bore can, for example, be configured as an obliquely extending through-bore through the dummy piston, wherein the bypass bore inlets are oriented toward the respective connecting bore inputs to be connected.

Here it is advantageous in particular when the dummy piston is disposed in the piston bore with a defined spatial orientation. Such a spatial orientation can be achieved, for example, by providing markings on the dummy piston and on the piston bore. Alternatively or additionally the dummy piston can be rotationally secured in the piston bore to maintain a spatial orientation and provide a rotationally secure reception of the dummy piston in the piston bore. Such a rotational securing can be formed, for example, by a projection formed on the dummy piston, which projection engages into a corresponding recess in the piston bore. It is also possible that the rotational securing is achieved via a special design of one of the closure elements closing the piston bore in a fluid-tight manner, or an additional element, such as, for example, a hexagonal element that interacts with the dummy piston and the closure element in order to provide the rotational securing.

An essentially longitudinally extending inner bore is advantageous in particular as a bypass bore, which inner bore is in turn fluidically connected to at least one of the connecting bores via at least one preferably radially extending jacket bore. Straight-extending bores are easier to produce than obliquely extending bores and can be precisely adapted to the required geometries.

An exemplary embodiment is particularly preferred wherein the dummy piston includes a first and a second annular space that are respectively fluidically connected on the one hand to at least one of the connecting bores, and on the other hand fluidically connected to the bypass bore, wherein the bypass connection is formed via the first annular space, the bypass bore, and the second annular space. In such a design a specific spatial orientation can be omitted, since the annular spaces ensure a fluidic connection in any position of the dummy piston.

Furthermore, in this exemplary embodiment the annular spaces can be embodied significantly smaller in terms of practical volume, with the result that no difficult volumetric considerations and calculations need to be carried out, and the volume for the lubricant receivable by the bypass connection can be precisely defined.

According to a further advantageous exemplary embodiment the inner bore can be embodied as a blind bore that can advantageously be closed at its open end so that a particularly simple design of the dummy piston is possible. Here it is advantageous in particular that the inner bore is closable via a ball-plug-sealing or a stopper in order to provide the defined volume. Such closure elements are simple to attach and can precisely define the volume.

According to a further advantageous exemplary embodiment, the dummy piston includes an outer surface that has an outer diameter that corresponds to an inner diameter of the piston bore such that the outer surface of the dummy piston fluidically seals the lubricant inlet bore and the lubricant outlet bores. Here the dummy piston furthermore includes at least one recess on the outer surface, which recess fluidically connects the two connecting bores, and that forms the bypass connection. Such a dummy piston is particularly simple to manufacture, since no bores need to be introduced in the piston, but rather only material on the outer surface has to be removed.

Furthermore, one exemplary embodiment is advantageous when the dummy piston includes at least one seal that is configured to fluidically seal and thus close the lubricant inlet bore and/or the lubricant outlet bores. It can thereby be ensured that no lubricant flows between the dummy piston outer surface and the piston bore.

According to a further advantageous exemplary embodiment, each piston bore includes four lubricant-guiding connecting bores, and the dummy piston is symmetrically constructed and includes a bypass connection on each side, which bypass connection in turn connects two lubricant-guiding connecting bores. Lubricant can thereby be transferred via the dummy piston from one piston bore into the other piston bore, wherein the functioning of the progressive distributor is not impaired.

According to a further advantageous exemplary embodiment, the piston bore is a through-bore extending through the housing and closable in a fluid-tight manner by a releasably connectable but fluid-tight closure element on both sides. The piston bore can thereby be easily maintained, and pistons in the piston bore can be replaced, so that a modular design of the progressive distributor is possible. Of course it is also possible to embody the piston bore as a blind bore.

Furthermore, in order to enable a sufficient throughput of lubricants past the dummy piston, as a preferred exemplary embodiment shows, the bypass connection can be dimensioned such that a quantity of lubricant receivable from the bypass connection is smaller than the metered quantity of lubricant of the metering piston. The problem of the connecting of two outlets can thereby be solved. Without adapting the volume, the lubricant from the outlet that is no longer required would be dispensed unregulated to the second adjacent outlet. The sum of the first, blind-connected and second, open outlet would thereby been dispensed at the second outlet, which leads to an oversupplying with lubricant to the consumer and must be avoided. The dispensed quantity of lubricant can be adapted by limiting the receivable volume in the dummy piston.

According to a further advantageous exemplary embodiment, the progressive distributor includes a dummy piston that is not displaceable, thus is disposed in the piston bore without a stroke. The actual functionality of the progressive distributor can thereby be retained.

According to a further advantageous exemplary embodiment, the dummy piston is manufactured from a metal or a plastic material. Metal has the advantage that high pressures are also supportable, and the piston is configured as a simple turned part. Furthermore, the dummy piston can be processed on the same machine in the same way as the metering piston, so that no additional tools are required. In contrast, plastic material is simple to manufacture, and the piston can be injection-molded. However, here a corresponding dimensional tolerance is to be taken into account so that the volume can be precisely set.

The progressive distributor is advantageously configured such that lubricant is present in the bores in a pressurized manner.

Another aspect of the invention comprises a progressive distributor for lubricant comprising a housing block. The housing block includes a lubricant inlet bore via which lubricant is introducible into the progressive distributor, and a first outlet bore and a second outlet bore via which a metered quantity of lubricant is dispensable to a consumer connected to the respective lubricant outlet bore. The housing block also includes a first piston bore, a second piston bore and a third piston bore, each of the first, second and third piston bores having an inlet opening in fluid communication with the inlet bore and a first outlet opening in fluid communication with the first outlet bore and a second outlet opening in fluid communication with the second outlet bore. The housing block also incudes a first connecting bore and a second connecting bore connecting the first piston bore to the second piston bore, and a third connecting bore and fourth connecting bore connecting the second piston bore to the third piston bore. A first metering piston is mounted in the first piston bore and is slidable between a first position in which the inlet opening of the first piston bore is connected to the first outlet bore and a second position in which the inlet opening of the first piston bore is connected to the second outlet bore, and a second metering piston is mounted in the second piston bore, the second metering piston being slidable between a first position in which the inlet opening of the second piston bore is connected to the first outlet bore and a second position in which the inlet opening of the second piston bore is connected to the second outlet bore. A dummy piston is fixed in the third piston bore to permanently block the inlet opening of the third piston bore and the first outlet opening of the third piston bore and the second outlet opening of the third piston bore. The dummy piston includes a first bypass passage configured to fluidly connect the first connecting bore to the third connecting bore and a second bypass passage configured to fluidly connect the second connecting bore to the fourth connecting bore.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
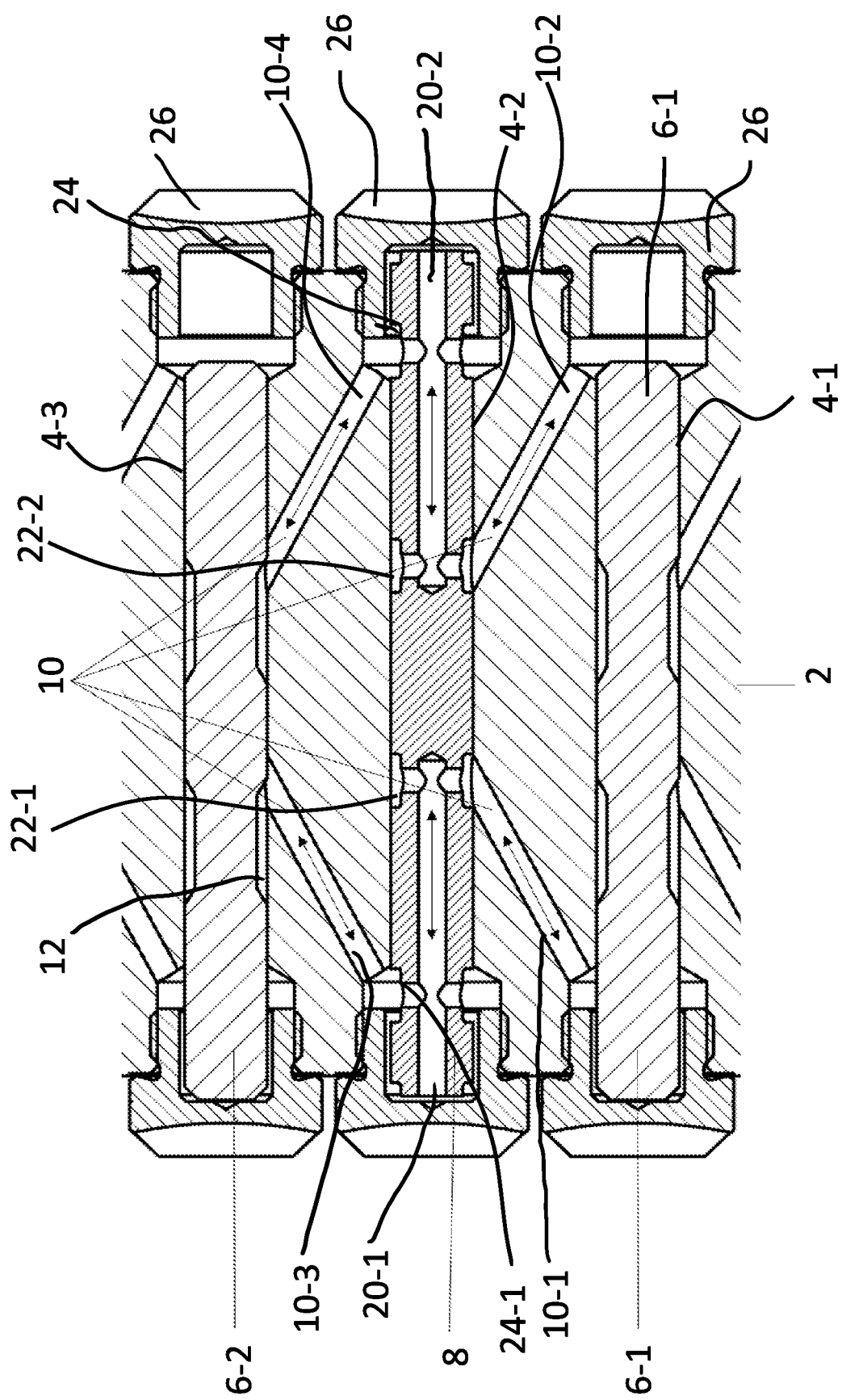
FIG. 1 is a first sectional view through a progressive distributor according to an embodiment of the disclosure.
Figure 2:
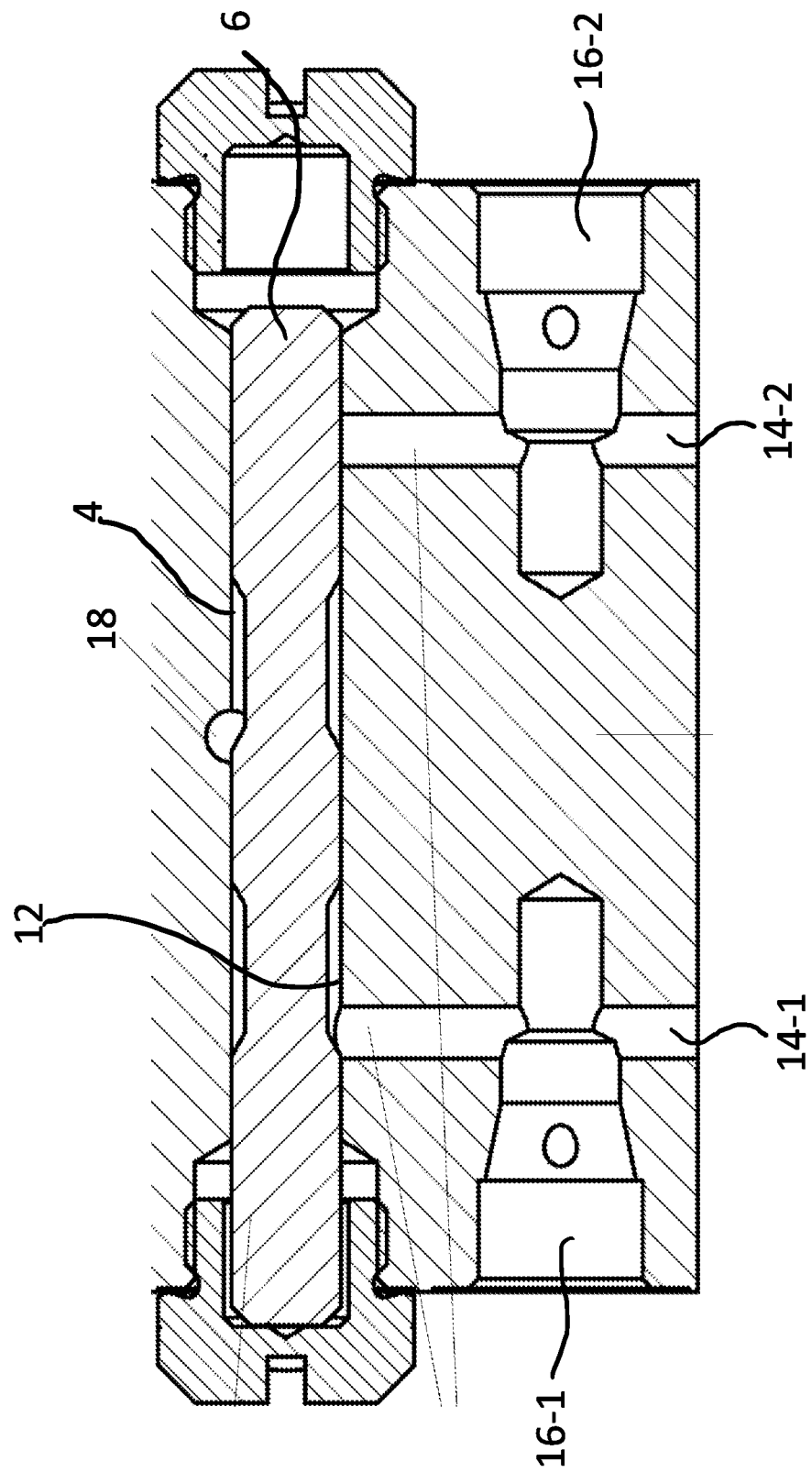
FIG. 2 is a second sectional view through the progressive distributor of FIG. 1.
Figure 3:
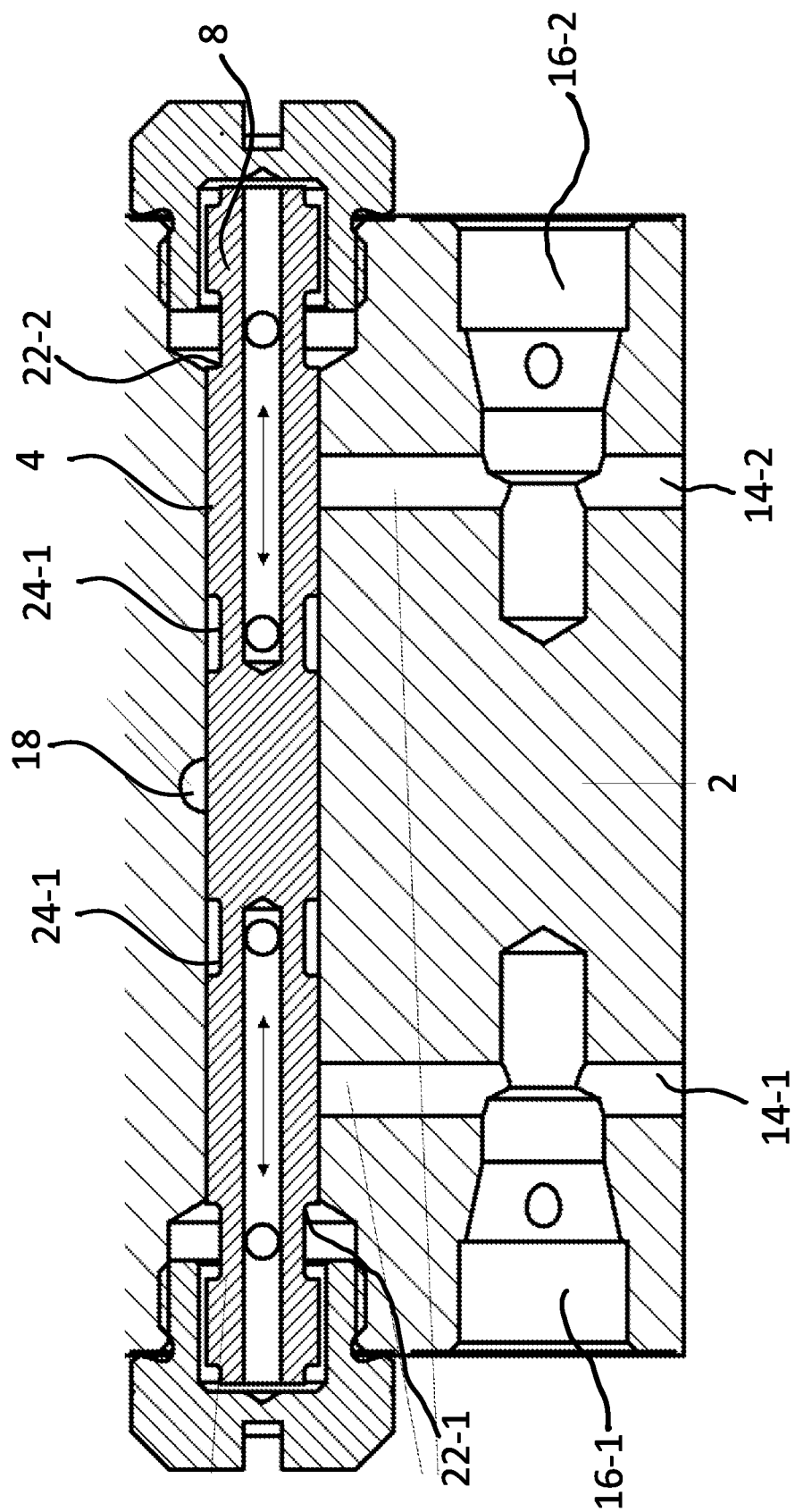
FIG. 3 is a third sectional view through the progressive distributor of FIG. 1.

FIGS. 1 to 3 show various sectional views through parts of a progressive distributor 1 in block construction. For this purpose the progressive distributor 1 includes a housing block 2 as usual, into which a plurality of bores are introduced. As can be seen from the sectional views of FIGS. 1, 2, and 3, the housing block 2 includes piston bores 4-1, 4-2, 4-3, in which a metering piston 6-1, 6-2 or a dummy piston 8 are receivable.

As can furthermore be seen from FIG. 1, the piston bores 4-1, 4-2, 4-3 are connected to each other via connecting bores 10. Lubricant is transmitted via these connecting bores 10 from one piston bore to another piston bore or to a lubricant outlet bore 14-1, 14-2 and associated lubricant outlet 16-1, 16-2 (FIGS. 2 and 3). Here FIG. 2 is a sectional view through lubricant outlets that are associated with a metering piston 6, while FIG. 3 shows a sectional view through lubricant outlets that are associated with the dummy piston 8.

In the depicted exemplary embodiment of the progressive distributor 1, lubricant can be guided via the connecting bores 10-1, 10-2, 10-3, 10-4 between the piston bores 4-1, 4-2 and 4-3 or to the associated lubricant outlets 14-1, 14-2 (see FIGS. 2 and 3). Thus, for example, in an operating state of the progressive distributor 1 lubricant can be transferred from the piston bore 4-1 via the connecting bore 10-1 into the piston bore 4-2 and from there via the dummy piston 8 and the connecting bore 10-3 into the piston bore 4-3. From there the lubricant can then be transferred via the annular space 12 into the lubricant outlet bore 14-1 and into the lubricant outlet 16-1.

As can be seen in particular from FIG. 2, the metering piston 6 is displaceably disposed in the piston bore 4 and can alternatingly release either the lubricant outlet bore 14-1 or the lubricant bore 14-2. Furthermore, for example, as can be seen from FIG. 2 and as can be seen from FIG. 3, the housing includes a lubricant inlet bore 18 via which the lubricant is provided to the individual piston bores 4.

Since the principal functioning of a progressive distributor is known and is not changed, an explanation of the functioning and how the metering piston 6 is displaced is omitted. However, since progressive distributors 1 are based on the fact that the metering pistons 6 are successively displaced from a first position into a second position in order to either dispense the lubricant at the lubricant outlet 16-1, 16-2 or to apply the appropriate pressure against the metering piston 6 in order to displace it from a first position into a second position, a piston bore or lubricant outlets 16-1, 16-2 connected thereto cannot be easily switched to inactive.

In particular, with a pure inactivation, wherein, for example, the lubricant outlets 16-1, 16-2 are simply closed, lubricant would accumulate in the piston bores, connecting bores and outlet bore and would sooner or later clog those bores. According to the disclosure both the lubricant inlet bore 18 and the lubricant outlet bores 14-1, 14-2 are closed using the inserted dummy piston 8. Due to the closing both of the inlet bore 18 and outlet bore 14-1, 14-2, an improved transit of the lubricant past the dummy piston 8 can be achieved, which on the one hand improves the service life of the progressive distributor itself and also improves the precision of the lubrications themselves.

In the exemplary embodiment depicted in FIGS. 1 and 3, the dummy piston 8 furthermore includes two bypass connections that each comprise an inner bore 20-1, 20-2 and two bores extending perpendicular thereto, and is configured to connect annular space 22-1 to annular space 24-1 and to connect annular space 22-2 to annular space 24-2. The annular spaces 22-1, 22-2 or 24-1, 24-2 are in turn fluidically connected to the connecting bores 10. The inner bore 20-1 can be simply configured as a blind bore as in the depicted exemplary embodiment, but other solutions are also possible that enable a fluidic connection between the connecting bores 10. As can be seen in particular from FIG. 3, the dummy piston 8 is furthermore configured such that the lubricant outlet bore 14-1 disposed between the annular spaces 22-1 and 24-1 is sealingly closed by the dummy piston 8. The lubricant supply bore 18 is also sealingly closed by the dummy piston 8, so that lubricant is supplied only via the connecting bores 10 (see FIG. 1) to the piston bore 4-2 and to the dummy piston 8. The inner bore 20-1 and the annular spaces 22-1 and 24-1 can be very easily modified such that only a certain lubricant volume can be received in their cavities. Since the main volume is defined via the inner bore 20-1, inhomogeneous lubricant distributions in the annular spaces 22-1, 24-1 are of no consequence, so that it can be ensured that no dead space remains wherein lubricant can accumulate. It can thereby be ensured that the entire lubricant volume that is present inside the dummy piston 8 is exchanged during an operating cycle of the progressive distributor, so that no lubricant accumulation points form.

As depicted in FIG. 1, the inner bores 20-1, 20-2 can be laterally open; however, it is preferred to terminate the inner bores 20-1, 20-2 laterally with a closure element (not depicted), such as, for example, a ball-plug-seal or plug. The volume can thereby be further reduced.

Instead of separate closure elements for the inner bore, closure elements 26 provided for the piston bore can also be used as closure elements for the inner bore 20. The closure elements 26 are usually simply screwed in and, as standard, terminate the piston bores 4-1, 4-2, 4-3 in a fluid-tight manner. In addition, they make possible an easy exchange or access to the piston bores 4-1, 4-2, 4-3 and thus an easy exchange of the metering pistons 6-1. 6-2 or the dummy piston 8. This also enables the lubricant distributor 1 to be easily adapted to given circumstances.

In further exemplary embodiments, a plurality of the piston bores can be inactivated with dummy pistons 8 so that with the same design of the housing block the number of lubrication points to be supplied can be varied. This can also be effected subsequently by replacement of one or more metering pistons 6-1, 6-2 by dummy pistons 8. Conversely, dummy pistons 8 can also be replaced by metering pistons in order to increase the number of lubrication points.

Thus with the disclosed progressive distributor it is possible to carry out adaptations even with progressive distributors in block construction. The dummy piston used for this purpose is adapted such that lubricant cannot remain in the region of the dummy piston, so that too much unnecessary lubricant is not dispensed and a uniform distribution of the lubricant is possible. In addition, the dead volume is limited, and it is ensured that a regular exchange of the lubricant is possible in the progressive distributor. By making the individual piston bores blind, there is the possibility to modulate the progressive distributor, even if it is embodied in block construction, and thus to increase the flexibility of the system.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved progressive lubricant distributors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Progressive distributor
2 Housing block
4 Piston bore
6 Metering piston
8 Dummy piston
10 Connecting bore
12 Annular space
14 Lubricant outlet bore
16 Lubricant outlet
18 Lubricant inlet bore
20 Inner bore
22 First annular space
24 Second annular space
26 Closure cap

What is claimed is:

1. A progressive distributor for lubricant comprising a housing block,
wherein the housing block includes:
a lubricant inlet bore via which lubricant is introducible into the progressive distributor,
a first outlet bore and a second outlet bore via which a metered quantity of lubricant is dispensable to a consumer connected to the respective lubricant outlet bore,
a first piston bore, a second piston bore and a third piston bore, each of the first, second and third piston bores having an inlet opening in fluid communication with the inlet bore and a first outlet opening in fluid communication with the first outlet bore and a second outlet opening in fluid communication with the second outlet bore,
a first connecting bore and a second connecting bore connecting the first piston bore to the second piston bore,
a third connecting bore and fourth connecting bore connecting the second piston bore to the third piston bore,
a first metering piston in the first piston bore, the first metering piston being slidable between a first position in which the inlet opening of the first piston bore is connected to the first outlet bore and a second position in which the inlet opening of the first piston bore is connected to the second outlet bore,
a second metering piston in the third piston bore, the second metering piston being slidable between a first position in which the inlet opening of the third piston bore is connected to the first outlet bore and a second position in which the inlet opening of the third piston bore is connected to the second outlet bore, and
a dummy piston fixed in the second piston bore and permanently blocking the inlet opening of the second piston bore and the first outlet opening of the second piston bore and the second outlet opening of the second piston bore, the dummy piston including a first bypass passage configured to fluidly connect the first connecting bore to the third connecting bore and a second bypass passage configured to fluidly connect the second connecting bore to the fourth connecting bore.

2. The progressive distributor according to claim 1,
wherein the first bypass passage includes a first substantially longitudinally extending inner bore in the dummy piston and a first substantially radially extending bore in fluid communication with the first inner bore.

3. The progressive distributor according to claim 2,
wherein the dummy piston furthermore includes a first reduced diameter portion forming a first annular space in the second piston bore and a second reduced diameter portion forming a second annular space in the second piston bore, and
wherein the bypass passage includes the first annular space, the first inner bore, the first radially extending bore and the second annular space.

4. The progressive distributor according to claim 3,
wherein the first inner bore is configured as a blind bore.

5. The progressive distributor according to claim 4, wherein a volume of the bypass passages is smaller than the metered quantity of lubricant.

6. The progressive distributor according to claim 3, including a ball-plug-seal or a stopper closing the first inner bore.

7. The progressive distributor according to claim 1,
wherein an outer surface of the dummy piston is adapted to an inner diameter of the second piston bore such that the outer surface of the dummy piston fluidically seals the lubricant inlet bore and the lubricant outlet bores of the second piston bore, and
wherein the dummy piston further includes at least one annular recess on the outer surface which fluidically connects the first connecting bore to the third connecting bore.

8. The progressive distributor according to claim 1,
wherein the dummy piston is centrally symmetric and includes a second substantially longitudinally extending inner bore and a second substantially radially extending bore in fluid communication with the second inner bore and a third reduced diameter portion forming a third annular space in the second piston bore and a fourth reduced diameter portion forming a fourth annular space in the second piston bore, and
wherein the third annular space and the second inner bore and the fourth annular space connect the second connecting bore to the fourth connecting bore.

9. The progressive distributor according to claim 1, wherein a volume of the bypass passages is smaller than the metered quantity of lubricant.

10. The progressive distributor according to claim 1, wherein the first piston bore is a through-bore extending through the housing block closed in a fluid-tight manner on a first end by a first closure cap that is releasably connected to the housing and on a second end by a second closure cap that is releasably connected to the housing.

11. A progressive distributor for lubricant including a housing block,
wherein the housing block includes a lubricant inlet bore, via which lubricant is introducible into the progressive distributor, and a plurality of lubricant outlet bores, via which a metered quantity of lubricant is dispensable to a consumer connected to the respective lubricant outlet bore,
wherein for the dispensing of the metered lubricant amount a plurality of metering pistons are provided in the housing, which metering pistons are received in associated piston bores, wherein each piston bore is associated with two lubricant outlet bores, and the metering piston is displaceable in the piston bore and is configured to alternatingly release the one or the other lubricant outlet bore in order to dispense the metered lubricant amount to the lubricant outlet bore, wherein furthermore the piston bores are fluidically connected to the lubricant inlet bore, and the piston bores are fluidically connected to each other via connecting bores in order to transfer lubricant to the other piston bores, and
wherein in at least one of the piston bores, a dummy piston is disposed that permanently closes both the lubricant inlet bore and both lubricant outlet bores, and includes at least one bypass connection that fluidically connects two of the connecting bores to each other in order to direct lubricant past the dummy piston into the connecting bores leading to the next piston bore.

* * * * *